United States Patent [19]
Levesque et al.

[11] 3,832,618
[45] Aug. 27, 1974

[54] ELECTRONIC DIFFERENTIAL PRESSURE TRANSMITTER

[75] Inventors: Peter S. Levesque, Jenkintown; Max Gaertner, Warminster, both of Pa.

[73] Assignee: Fischer & Porter Company, Warminster, Pa.

[22] Filed: Jan. 29, 1973

[21] Appl. No.: 327,562

[52] U.S. Cl............... 318/676, 318/645, 318/662, 73/398 R
[51] Int. Cl. ............................................. G01l 9/10
[58] Field of Search ........... 318/645, 646, 642, 644, 318/662, 676; 73/398 R, 398 C

[56] References Cited
UNITED STATES PATENTS

| | | | |
|---|---|---|---|
| 2,634,747 | 4/1953 | Markson | 73/398 R |
| 2,847,625 | 8/1958 | Popowsky | 73/398 R |
| 2,980,835 | 4/1961 | Williams | 73/398 R |
| 3,342,072 | 9/1967 | Trekell | 73/398 R |
| 3,564,923 | 2/1971 | Nudd, Jr. et al. | 73/398 R |
| 3,660,745 | 5/1972 | Bertrand | 318/645 X |

*Primary Examiner*—B. Dobeck

[57] ABSTRACT

An electronic differential pressure transmitter for use with industrial processes to produce an output signal suitable for transmission to a remote station for operating, indicating, recording or control equipment. The transmitter includes a force bar to which an input force is applied, the resultant bar displacement being sensed by a detector coupled to an electronic circuit yielding a feedback signal proportional to the input force. The feedback signal is fed to a motor that applies to the bar a rebalancing force in opposition to the input force. Adjustment in the span of the instrument is effected electronically by a circuit in which the feedback signal is split between the motor and a shunt path to an extent affording the desired span.

11 Claims, 5 Drawing Figures

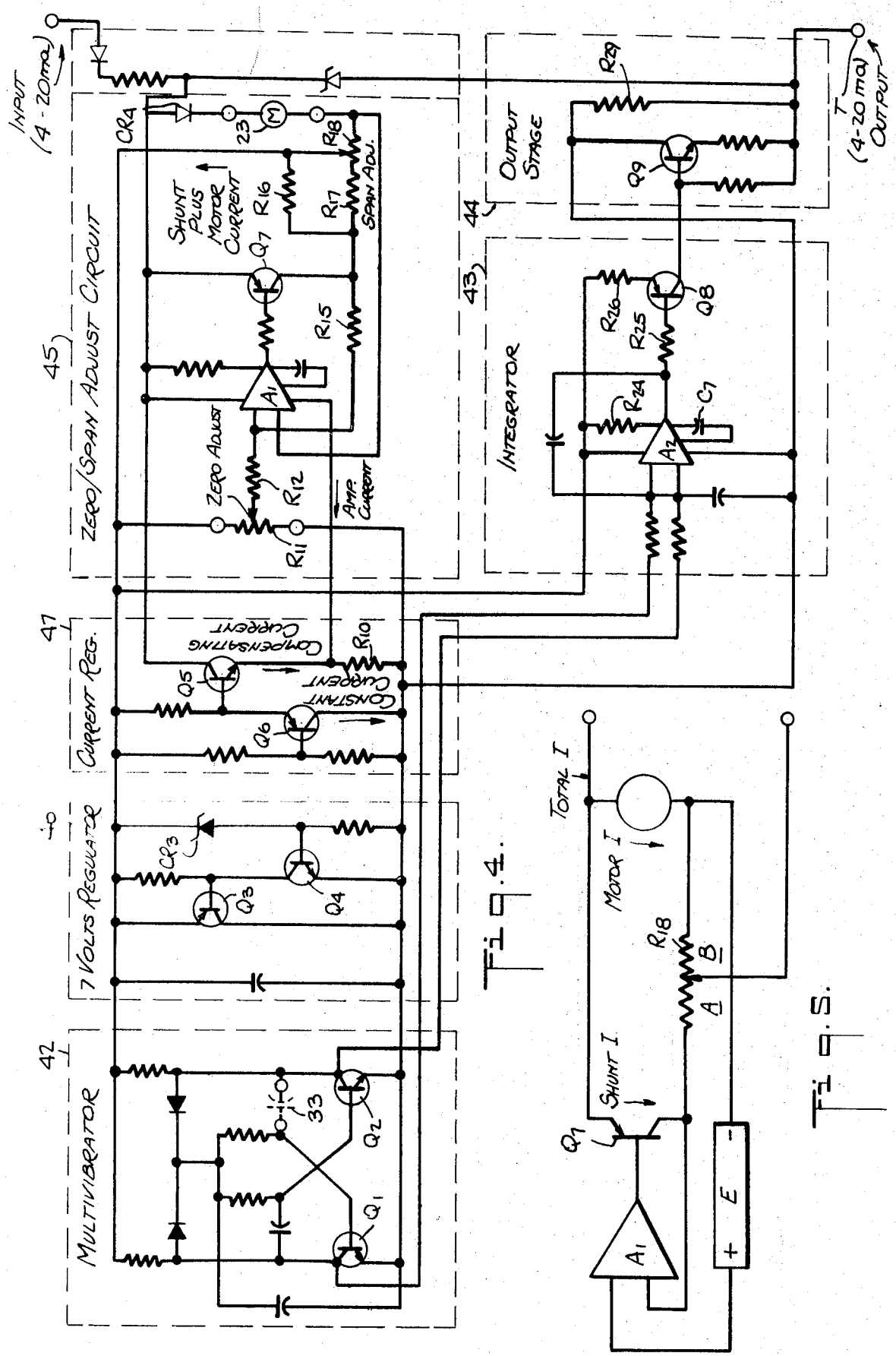

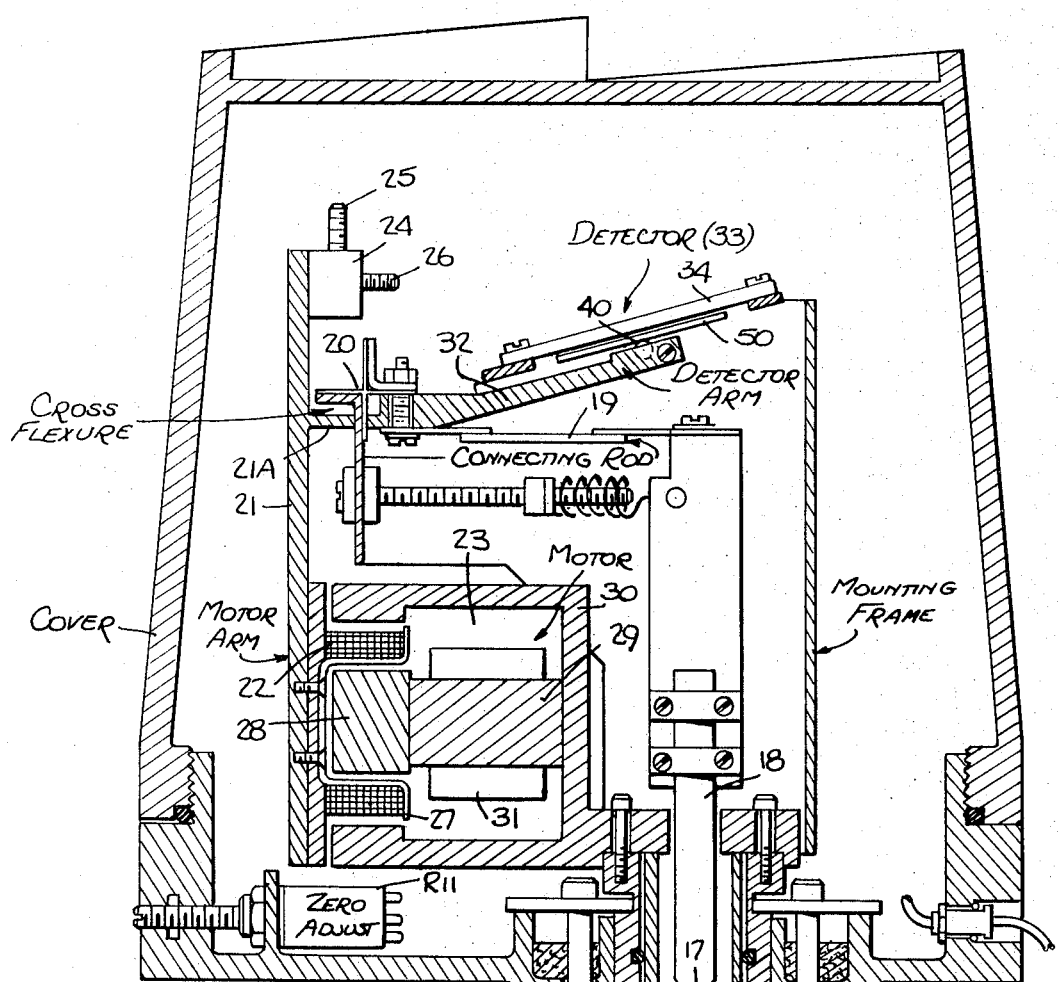
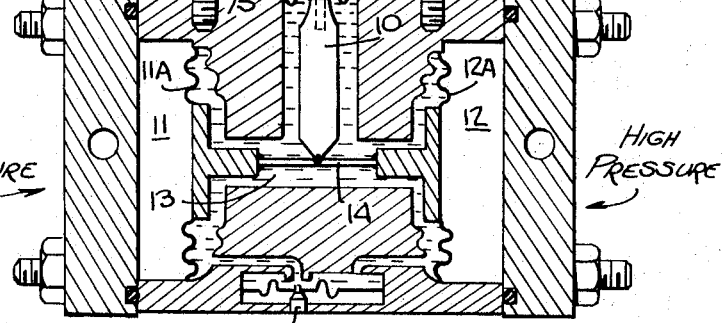
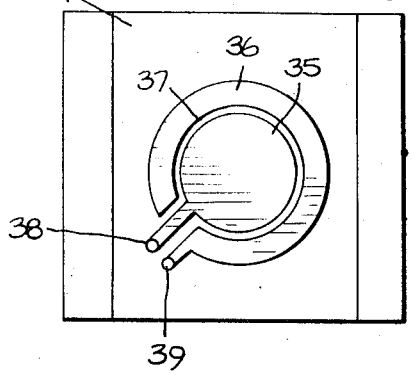

ELECTRONIC DIFFERENTIAL PRESSURE TRANSMITTER

BACKGROUND OF THE INVENTION

This invention relates generally to electronic differential pressure transmitters, and more particularly to an improved transmitter of the force balance type.

One important application of the force balance principle is in the differential pressure flow transmitter. In a transmitter of this type, an elongated force bar is pivoted about a transverse axis. An input force derived from a differential pressure capsule and corresponding to the flow rate of the fluid to be measured is applied to the force bar to produce a torque about its fulcrum. Also applied is a rebalance torque which tends to hold the bar motionless.

The rebalance torque is developed by a negative feedback loop that includes a detector to sense any slight change in force bar position due to an unbalance of torques. The detector directs a corresponding feedback signal to a feedback motor that applies to the force bar a force in opposition to the input force. This feedback signal is maintained proportional to the flow rate being measured and is used therefore to produce an output signal for transmission to a remote control station or to an indicating or recording device.

In a force-balance instrument of the electrical type, the feedback system is provided with an electric motor and the output signal is electrical in nature, whereas in the pneumatic type, such as that disclosed in the co-pending application Ser. No. 212,585 of Siegel (common assignee), the motor is in the form of a pneumatically actuated bellows and the output signal which is applied to the bellows is fluidic in nature.

In a force-balance transmitter, there is virtually no movement of the force bar over the full-scale range of operation. This virtual absence of movement is highly advantageous, for it effectively eliminates hysteresis and other errors of the type encountered in so-called motion-balance instruments. On the other hand, existing instruments suffer from certain drawbacks which have somewhat limited their applicability. For example, prior instruments are excessively sensitive to positional orientation and vibration. Also, with existing instruments, friction at contact points gives rise to inaccuracies.

In a force balance instrument, it is important to be able to change the operating range or span of the instrument. In an instrument of the type disclosed in U.S. Pat. No. 3,564,923, in which the feedback system is electrical in nature and employs a feedback motor, the force balance mechanism includes a vernier range-changing structure in the form of a flexured reaction member and a rotatable support element adapted to change range without altering the static balance of the instrument. In this patent, in order to effect relatively large changes in range, the winding of the motor is split into sets which are selectively connected so as to alter the effective number of turns and thereby bring about gross step changes in the force developed by the motor armature.

SUMMARY OF THE INVENTION

In view of the foregoing, it is the main object of this invention to provide a differential-pressure (D-P) transmitter of the force-balance type, which is of simplified and efficient design, the transmitter being adapted to generate and send a process-signal current (normally 4 – 20 ma) that is proportional to the differential pressure applied to the instrument.

More particularly, it is an object of this invention to provide a D-P transmitter of the above type, having a fixed mechanical span, the span of the instrument being varied electronically by a current-splitting circuit that shunts an adjustable percentage of the total current around the force motor.

A significant feature of the invention is that the need for a span adjustment mechanism is obviated, the mechanical advantage from the force motor to the meter body having a high value and being fixed.

Also an object of the invention is to provide an electronic D-P transmitter in which displacement of the force beam is sensed by a capacitive detector whose value is varied as a function of beam movement, which detector is formed by two fixed electrodes in spaced relation and an armature mechanically coupled to the force beam and arranged to vary the capacitance established between the fixed electrodes.

An advantage of this detector structure lies in the fact that the armature floats electrically, whereby changes in capacitance are presented at the output terminals of the detector without the need for moving wires.

Yet another object of the invention is to provide an electronic circuit operating in conjunction with a capacitive detector, and including a free-running multivibrator whose output duty cycle is indicative of the capacitor value.

Briefly stated, these objects are attained in a differential-pressure transmitter including a force bar to which an input force is applied, the resultant displacement of the bar being sensed by a detector included in an electronic circuit to produce a feedback signal that is proportional to the input force and is fed to a motor that applies to this force bar a rebalancing force in opposition to the input force.

Adjustment in span is effected by a span-adjust circuit in which the feedback signal is split between the motor and a shunt path to a degree providing the desired span. The detector is preferably of the capacitive type, and is associated with a free-running multivibrator whose output duty cycle is indicative of the detector capacitance, the multivibrator output being integrated and amplified to produce said feedback signal.

OUTLINE OF THE DRAWING

For a better understanding of the invention as well as other objects and further features thereof, reference is made to the following description to be read in conjunction with the accompanying drawing, wherein:

FIG. 1 schematically shows the structure of a differential-pressure transmitter in accordance with the invention;

FIG. 2 is a plan view of the capacitive detector included in the transmitter;

FIG. 4 is a schematic diagram of the electronic circuit; and

FIG. 5 is a simplified schematic of the zero-span adjust circuit.

DESCRIPTION OF THE INVENTION

1. The D-P Transmitter Structure

Figure 3:
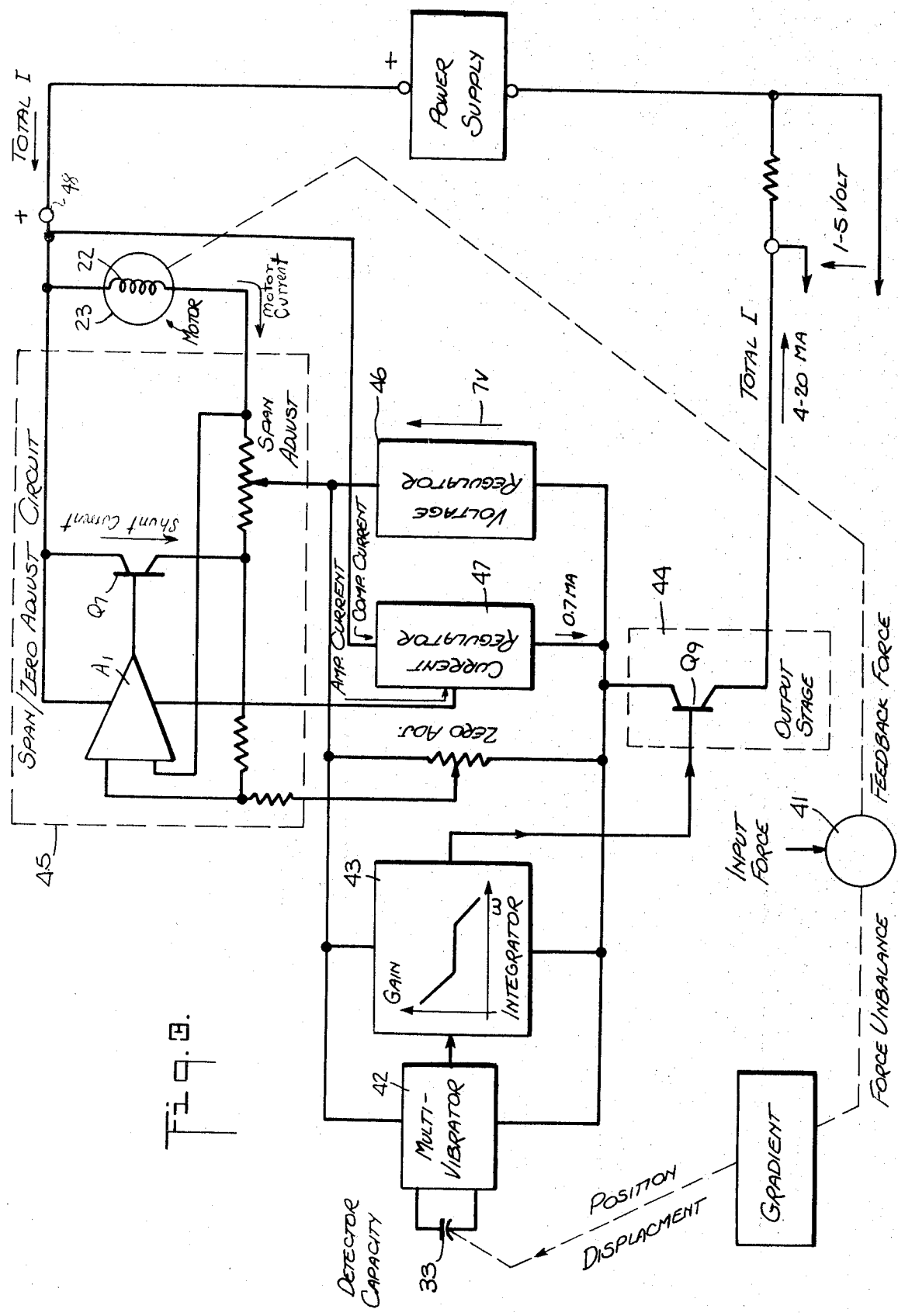
FIG. 3 is a block diagram of the mechanism of the transmitter and the electronic circuit associated therewith.

Referring now to FIG. 1, there is illustrated in schematic form, a differential-pressure transmitter in accordance with the invention. The two major elements of the D-P transmitter are the measuring element that senses the existing differential pressure and converts it to a force, and the force-beam element that at one end receives the force from the measuring element, and at the other end receives a rebalancing force from a feedback motor.

The measuring element is generally defined as that portion of the instrument below the fulcrum of the force beam 10. This element includes a differential-pressure capsule provided with a pair of identical pressure chambers 11 and 12 in which are mounted corrugated metal diaphragms 11A and 12A. The diaphragms enclose a chamber containing a hydraulic fill 13. Low and high fluidic pressure are applied to chambers 11 and 12, respectively. In practice, suitable pipes carrying fluid under pressure are coupled to the chambers, the pipes being connected upstream and downstream of an orifice plate inserted in a process line, whereby the differential pressure between the upstream and downstream pipes is proportional to the rate of fluid flow through the line. The D-P transmitter may therefore be mounted directly in the line at a point remote from a central control station to which the measurement data is sent in the form of an electrical signal. At the control station, the received signal may be indicated or recorded, or used to operate process-control apparatus.

In the instrument capsule, diaphragms 11 and 12 are joined together by means of a horizontal link 14 whose midpoint is connected to the lower extremity of elongated force beam 10 which is pivotally supported in the vertical position by a seal diaphragm 15 and by vertical flexures (not shown). Because of the difference between the low and high pressure fluids applied to pressure-responsive diaphragms 11 and 12, the link 14 tends to shift leftward to an extent depending on this difference, thereby applying a force to the lower extremity of beam 10.

The purpose of hydraulic fill 13 is to provide hydraulic damping for noise, this being adjusted by throttling the flow of fluid in the passage between the diaphragm sections by means of a needle valve 16 inserted in the passage. Over range protection is provided by allowing the diaphragm to seat in a nest in the motor body which has convolutions matching those of the diaphragm.

The force developed by the differential causes forcebeam 10 to swing in a clockwise direction about its fulcrum 17. Thus, produced in a force-beam extension 18 secured to the upper end of beam 10 and projecting upwardly therefrom, is a rightwardly directed force which pulls on a connecting rod 19 attached at right angles to the upper end of extension 18. The other end of this rod is connected to a cross-flexure 20.

Also secured to cross-flexure 20 is fulcrum 21A of a motor arm 21, to whose lower portion is attached the coil 22 of a moving-coil or electrodynamic type of force motor, generally designated by numeral 23. The coil is counterbalanced in order to reduce the effects of gravity and vibration. This is accomplished by means of a counterweight 24 attached to the upper end of motor arm 21. The counterweight is provided with balance-adjusting screws 25 and 26.

Damping of the motor is effected by a tubular aluminum bobbin 27 on which coil 22 is wound. The coil is movable axially with respect to the pole 28 of a permanent magnet 29, whose other end is anchored on the frame 30 of the motor. The motor is temperature-compensated by shunting magnet 29 with a nickel-alloy shunt element 31 having a negative temperature coefficient of permeability. While there is shown a preferred form of motor, the invention is also workable with known types of feedback motors.

Also secured to cross-flexure 20 is the arm 32 of a capacitive detector, generally designated by numeral 33. The detector is constituted by a dielectric plate 34 preferably made of borosilicate glass, whose face is metalized in a pattern to define the fixed electrodes of the capacitor.

As shown separately in FIG. 2, these fixed electrodes consist of a central, disc-shaped active area 35 which is surrounded by a split annular active area 36 spaced from the central area by a ring-shaped gap 37. Electrode 35 is connected by a conductive strip to terminal 38, and electrode 36 is connected by a conductive strip to terminal 39. Alternatively, the active areas may be constituted by a pair of semi-circular areas separated by a straight gap.

The capacitance established between the active areas 35 and 36 is varied by means of a metal armature 50 which forms a variable air gap along the underside of dielectric plate 34. The armature is mounted on the swingable detector arm 32 by means of a glass-ball swivel 40 which includes a set screw to hold the armature at an adjusted position. Thus the armature 50 floats electrically, its physical position determining the capacitance of the electrodes which are connected by fixed wires to the feedback circuit. There are no wires connected to moving parts of the capacitor, thereby avoiding failure as a result of repeated bending of leads.

In the differential-pressure transmitter, detector 33, which is operatively coupled to the force bar by detector arm 32, changes in value as a function of force-bar displacement. The detector is included in an electronic circuit, to be later disclosed, which generates a feedback signal that is applied to feedback motor 23. Feedback motor 23, through its motor arm 21, applies a force to the force bar through connecting rod 19 in opposition to the input force.

The mechanical span of the instrument, which is determined by the mechanical advantage from the force-motor to the meter body, is fixed, and the full advantage thereof is taken in a single "pass." That is to say, the motor force necessary to effect balance is developed by the motor arm 21 acting as a simple lever. In practice, a high mechanical advantage (24: 1) is obtained by so positioning the pivot of the motor arm as to obtain a high degree of leverage.

2. The Electronic System

Referring now to FIG. 3, there is shown the feedback circuit in block diagram form. It will be seen that an input force is applied to the force-beam structure at the summing junction 41 where the input force is compared with the feedback force produced by motor 23. The resultant force difference acts on the effective spring rate (gradient) of the transmitter mechanism to produce a displacement of the parallel-plate capacitive detector 33.

Detector 33 is connected to a free-running multivibrator 42 whose duty cycle is a function of the detector capacitance value. A free-running or astable multivibrator has no stable state (see Walston et al., "Transistor Circuit Design," pages 377–380). This change in duty cycle gives rise to a change in the differential average D-C voltage output of the multivibrator. This voltage change is integrated by integrator 43 and applied to the output stage 44 for power amplification.

The current through output stage 44 is defined as "total current." This total current (4 to 20 ma) is the signal output from the transmitter. But not all of the total current flows through force motor 23. The relationship between total current and motor current is determined by a span/zero adjust circuit 45. This relationship satisfies the following linear relation:

Motor Current = $S$ (Total Current) + $Z$, wherein $S$ is set by the span adjustment, and $Z$ is set by the zero adjustment.

The force generated by force motor 23 is proportional to the current passing through motor coil 22. This force is compared to the input force at the force-summing junction 41 to complete the closed loop. If the force generated by the force motor is less than the input force, a force unbalance is created. The detector 33 and integrator 43 are configured to bring about an increase in motor current in response to this condition, thereby bringing the loop back into balance.

The function of integrator 43 is to provide a very high loop gain at zero frequency (in order to drive the unbalance to zero) and to provide a decreasing gain and a constant gain band at higher frequencies in order to achieve dynamic stability. This is referred to in the art as a "proportional plus integral" amplifier. (See Kuo-Automatic Control Systems — pages 141 - 143).

Voltage (7 v.) regulator 46 provides a constant-voltage supply for the multivibrator 42, the integrator 43, the zero/span adjust circuit 45, and a current regulator 47. The current regulator 47 provides a bias current (i.e., 0.7 mA) which includes the current required to operate the amplifier $A_1$ in the zero/span adjust circuit. The requirement for this regulator is described in the following commentary on current distribution through the circuit.

The block diagram indicates the current path through the circuit. Current entering the + power supply node 48 is the total current. There are four branches leaving this node. These are:
1. Motor current
2. Shunt current
3. Amplifier current
4. Compensating current.

The current regulator performs the function of regulating the sum of the amplifier and compensating current at a fixed value D; so, Total $I$ = Shunt $I$ + Motor $I$ + D The zero/span adjust circuit is configured to set the relationship between Motor I and Shunt I. Since current D is regulated, this sets the relationship between Motor I and Total I, as required.

3. The Electronic Circuits

We shall, in connection with FIG. 4, now consider the electronic circuits constituting the main elements of the system shown in block form in FIG. 3.

Multivibrator 42 is of conventional design, and includes cross-coupled transistors $Q_1$ and $Q_2$. The collectors of transistors $Q_1$ and $Q_2$ are connected to the respective inputs of differential amplifier $A_2$ in integrator 43. When, for example, the capacity of detector 33 which is included in the multivibrator circuit, is less than 22 pF (with a gap of 0.006 inches between the detector plates, the detector capacity is 22 pF), transistor $Q_2$ will then be in its "off" state longer than transistor $Q_1$. As a consequence, the average voltage at the collector of transistor $Q_2$ will be greater than the average voltage at the collector of transistor $Q_1$.

In other words, the collector of $Q_2$ is positive with respect to the collector of $Q_1$ when the gap of detector 33 exceeds 0.006 inches, and is negative when the gap is less than 0.006 inches. When, however, the gap is exactly 0.006 inches, the voltage is zero.

Integrator 43 includes differential amplifier $A_2$ whose output is fed to a transistor $Q_8$. It can be shown that the transfer function of amplifier $A_2$ yields integral gain and proportional gain with roll-off at high frequencies. The amplifier transfer function therefore includes proportional and integral terms. The integral term drives the position error to zero, and the proportional term helps stabilize the loop.

The capacitor $C_7$ is required to stabilize the particular amplifier chosen, while resistor $R_{24}$ is needed to set the current through the amplifier. Resistor $R_{25}$ provides degeneration for the amplifier $A_2$, while resistor $R_{26}$ limits the current output of transistor $Q_8$, thereby limiting the total current to a reasonable value under any condition of operation.

Output stage 44 includes a current amplifier transistor $Q_9$ whose gain is determined by the ratio of resistor $R_{27}$ in the base circuit and resistor $R_{28}$ in the emitter circuit. The 4 to 20 mA output appears at output terminal T. Resistor $R_{29}$ in the collector circuit is required to establish the minimum current through the transmitter which must flow in order to "start" the circuit when power is initially applied.

In practice, the system is powered by a regulated 7 volt supply. Voltage (7 v.) regulator 46 is a shunt regulator, and includes transistors $Q_3$ and $Q_4$. For any current in the operating range of the regulator, the voltage drop across the regulator is constant. The regulated drop across the regulator is the drop across zener diode $CR_3$ and transistor $Q_4$, $V_{be}$. Diode $CR_3$ and transistor $Q_4$ are selected to have equal and opposite temperature coefficients to eliminate the effect of temperature on the circuit.

Current regulator 47 includes transistors $Q_5$ and $Q_6$. A fixed voltage of approximately 2 volts is applied to the base of transistor $Q_6$. The emitter-base junctions of transistors $Q_6$ and $Q_5$ are such that the net voltage drop and therefore the temperature coefficient, is zero. Thus the voltage drop across resistor $R_{10}$ in the emitter circuit of transistor $Q_5$ is constant.

Since the current through resistor $R_{10}$ is constituted by both the amplifier current from amplifier $A_1$ of the zero/span adjust circuit 45 and the compensation current passing through transistor $Q_5$, it follows that the sum of these currents is constant.

We shall now analyze the circuit arrangement and operation of the zero/span adjust circuit 45 in which force motor 23 is connected in series with diode $CR_4$. A shunt path is provided by transistor $Q_7$ whose emitter is connected to diode $CR_4$, and whose collector is connected through "span" adjusting potentiometer $R_{18}$ to the motor. The adjustable arm of span potentiometer $R_{18}$ is connected to one end of a "zero" adjusting potentiometer $R_{11}$, whose adjustable arm is connected to one input of a differential amplifier $A_1$.

Before considering the actual circuit of stage 45, we shall, in connection with FIG. 5, consider a simplified version of this circuit. In FIG. 5, it will be seen that the total current (Total I) is divided between motor 23 and the shunting transistor $Q_7$. The span potentiometer $R_{18}$ is divided into resistor sections A and B by its adjustable arm. The differential amplifier $A_1$, whose output is applied to the base of shunting transistor $Q_7$, cooperates therewith to hold the amplifier differential input to zero volts. It follows that:

$$\text{Shunt } I\ (A) = \text{Motor } I\ (B) + E,$$

where *Shunt I* is the current through transistor $Q_7$, *Motor I* is the current through motor 23, and *E* is the voltage applied to one input of the differential amplifier $A_1$. Thus, $$\text{Shunt } I = \text{Motor } I\ (B) + E/A$$

But, $$\text{Motor } I = \text{Total } I - \text{Shunt } I$$

$$\text{Motor } I = \text{Total } I - \text{Motor } I\ (B) + E/A$$

$$\text{Motor } I = \text{Total } I - \text{Motor } I\ (B/A) + (E/A)$$

$$\text{Motor } I = \text{Total } I + (E/A)/1 + (B/A)$$

In the actual schematic of the zero/span adjust circuit shown in FIG. 4, the voltage E is set by "zero" potentiometer $R_{11}$ and the voltage divider defined by resistors $R_{12}$ and $R_{15}$. This is the zero adjustment term.

Resistors $R_{16}$ and $R_{17}$ shape the position versus span characteristic of the network so that it is approximately logarithmic. This yields a constant percentage of rate resolution over the range of the adjustment. The voltage drop across diode $CR_4$ assures that some voltage will be available to Amplifier $A_1$ even when the motor current is very small.

Thus the arrangement is such that the span of the transmitter is fixed mechanically, zero and span adjustment being effected entirely by electronic means, potentiometer $R_{11}$ serving for zero adjustment and potentiometer $R_{18}$ for span adjustment.

While there has been shown and described a preferred embodiment of an electronic differential pressure transmitter in accordance with the invention, it will be appreciated that many changes and modifications may be made therein without, however, departing from the essential spirit thereof.

We claim:

1. A differential pressure transmitter comprising:
    A. a pivoted force bar;
    B. means to apply an input force to said force bar to effect displacement thereof from a balanced position;
    C. a detector mechanically coupled to said bar to produce an electrical value which varies as a function of said displacement;
    D. an electronic circuit coupled to said detector to produce an output signal proportional to said displacement;
    E. an electrical force motor mechanically coupled to said force bar to apply a force thereto in opposition to said input force to rebalance said bar; and
    F. means including a current-splitter circuit to apply said output signal to said motor to energize same, and to a shunt path in a ratio adjusting the transmitter to a desired span, said shunt path being constituted by a transistor and means to vary the conductivity of said transistor as a function of the current passing through said motor without regard to the resistance of the motor.

2. A transmitter as set forth in claim 1, wherein said input force is derived from a differential pressure capsule having low and high pressure diaphragms linked to the lowermost end of the force bar.

3. A transmitter as set forth in claim 2, wherein the upper end of said force bar is linked by a connecting rod to a force motor, and wherein said electrical force motor includes a motor arm whose fulcrum is a cross-flexure, and wherein said detector is connected by a detector arm to said force motor.

4. A transmitter as set forth in claim 3, wherein said motor is of the moving-coil type, the coil thereof being secured to one end of said motor arm.

5. A transmitter as set forth in claim 4, further including a counterweight on the other end of the motor arm, said counterweight being provided with adjustable balancing screws.

6. A transmitter as set forth in claim 1, wherein said detector is of the capacitance type and is formed by two spaced electrodes on one side of a dielectric plate and a movable armature on the other side of said plate to vary the effective gap between the electrodes, said armature being mounted on a ball swivel mechanically linked to said force motor.

7. A transmitter as set forth in claim 1, wherein said detector is of the capacitance type and said electronic circuit includes a free-running multivibrator coupled to said detector, the duty cycle of said multivibrator being indicative of the capacity of said detector.

8. A transmitter as set forth in claim 1, wherein said electronic circuit includes a voltage regulator.

9. A transmitter as set forth in claim 1, wherein said electronic circuit includes a current regulator.

10. A transmitter as set forth in claim 7, wherein the output of said multivibrator is applied to an integrator whose output is fed to a current-amplifying output stage.

11. A transmitter as set forth in claim 1, wherein said splitter circuit includes a transistor connected across said motor and forming said shunt path, an amplifier to control the conductivity of said transistor, and a span-adjusting potentiometer connected to said motor and to said amplifier to control the ratio of current passing through said path and said motor.

* * * * *